(12) United States Patent
Willems et al.

(10) Patent No.: US 10,087,859 B2
(45) Date of Patent: Oct. 2, 2018

(54) PARTIAL DEACTIVATION OF AN INTERNAL COMBUSTION ENGINE

(71) Applicant: Ford Global Technologies, LLC, Dearborn, MI (US)

(72) Inventors: Werner Willems, Aachen (DE); Paul Nigel Turner, Chelmsford (GB); Juergen Karl Stief, Aachen (DE); Guohui Chen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 14/964,257

(22) Filed: Dec. 9, 2015

(65) Prior Publication Data

US 2016/0195031 A1    Jul. 7, 2016

(30) Foreign Application Priority Data

Jan. 6, 2015   (DE) .......................... 10 2015 200 048

(51) Int. Cl.
  *F02D 41/00*    (2006.01)
  *F02D 13/02*    (2006.01)
  *F02D 9/02*     (2006.01)

(52) U.S. Cl.
  CPC ..... *F02D 41/0087* (2013.01); *F02D 13/0242* (2013.01); *F02D 41/0002* (2013.01);
  (Continued)

(58) Field of Classification Search
  CPC ............. F02D 41/0087; F02D 41/0082; F02D 13/0242; F02D 13/0246; F02D 13/0249; F02D 13/06; F02D 41/0002; F02D 41/008
  See application file for complete search history.

(56) References Cited

U.S. PATENT DOCUMENTS

| 8,196,404 B2 | 6/2012 | Onishi et al. |
| 2011/0144888 A1* | 6/2011 | Rollinger ................ F02D 17/02 701/103 |

(Continued)

FOREIGN PATENT DOCUMENTS

| DE | 10153478 A1 | 5/2003 |
| DE | 102010055515 A1 | 6/2012 |

(Continued)

*Primary Examiner* — Jacob Amick
(74) *Attorney, Agent, or Firm* — Julia Voutyras; McCoy Russell LLP

(57) ABSTRACT

Methods and systems are provided for an internal combustion engine having at least two cylinders configured in such a way that they form two groups, at least one cylinder of a first group being a cylinder which is operational in the event of a partial deactivation of the engine, and at least one cylinder of a second group being formed as a load-dependently switchable cylinder. An inlet-side throttle element is provided with at least one intake line of the switchable cylinder, by means of which the size of the flow cross section of the intake line can be varied, whereby the charge-air flow rate supplied to the deactivated cylinder in the event of a partial deactivation of the engine can be adjusted. Each outlet opening of a load-dependently switchable cylinder is equipped with a partially variable valve drive, with an outlet valve which opens or shuts off the outlet opening.

17 Claims, 4 Drawing Sheets

(52) U.S. Cl.
CPC ....... *F02D 41/008* (2013.01); *F02D 41/0082* (2013.01); *F02D 9/02* (2013.01); *F02D 13/0246* (2013.01); *F02D 2009/0244* (2013.01); *Y02T 10/18* (2013.01); *Y02T 10/42* (2013.01)

(56) References Cited

U.S. PATENT DOCUMENTS

| | | | | |
|---|---|---|---|---|
| 2013/0333663 | A1* | 12/2013 | Chen | F02D 17/02 123/334 |
| 2014/0331667 | A1* | 11/2014 | Kindl | F02M 26/43 60/602 |

FOREIGN PATENT DOCUMENTS

| | | | |
|---|---|---|---|
| DE | 102013210597 | A1 | 12/2013 |
| DE | 102015200045 | A1 | 7/2015 |
| WO | 2008149212 | A1 | 12/2008 |

\* cited by examiner

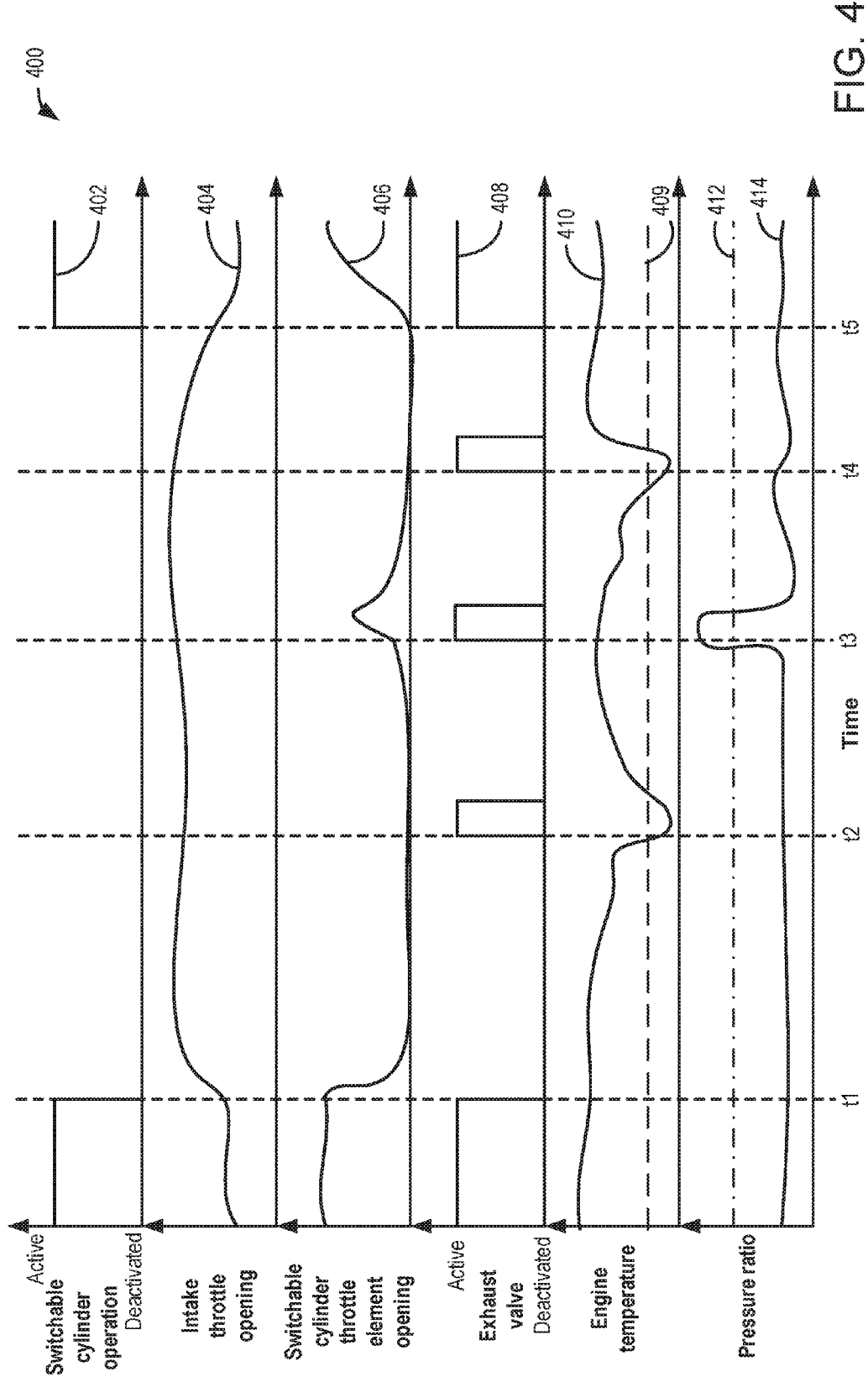

PARTIAL DEACTIVATION OF AN INTERNAL COMBUSTION ENGINE

CROSS REFERENCE TO RELATED APPLICATION

The present application claims priority to German Patent Application No. 102015200048.6, filed Jan. 6, 2015, the entire contents of which are hereby incorporated by reference for all purposes.

FIELD

The present description relates generally to system and method for cylinder deactivation in an internal combustion engine.

BACKGROUND/SUMMARY

An internal combustion engine is used as a motor vehicle drive unit. The expression internal combustion engine encompasses diesel engines and also Otto-cycle engines and hybrid internal combustion engines, that is to say internal combustion engines which are operated using a hybrid combustion process.

In the development of internal combustion engines, it is a basic aim to minimize fuel consumption, wherein the emphasis in the efforts being made is on obtaining an improved overall efficiency. Fuel consumption and thus efficiency pose a problem in particular in the case of Otto-cycle engines that is to say in the case of an applied-ignition internal combustion engine. The reason for this lies in the principle of the operating process of the Otto-cycle engine. Load control is generally carried out by means of a throttle flap provided in the intake system. By adjusting the throttle flap, the pressure of the inducted air downstream of the throttle flap can be reduced to a greater or lesser extent. The further the throttle flap is closed, that is to say the more said throttle flap blocks the intake system, the higher the pressure loss of the inducted air across the throttle flap, and the lower the pressure of the inducted air downstream of the throttle flap and upstream of the inlet into the at least two cylinders, that is to say combustion chambers. In this way, for a constant combustion chamber volume, it is possible for the air mass, that is to say the quantity, to be set by means of the pressure of the inducted air. This also explains why quantity regulation has proven to be disadvantageous specifically in part-load operation, because low loads require a high degree of throttling and a pressure reduction in the intake system, as a result of which the charge exchange losses increase with decreasing load and increasing throttling.

To reduce the described losses, various strategies for dethrottling an applied-ignition internal combustion engine have been developed. One example approach for dethrottling the Otto-cycle engine is by operating the engine with direct injection. The direct injection of the fuel is a suitable means for realizing a stratified combustion chamber charge. The direct injection of the fuel into the combustion chamber thus permits quality regulation in the Otto-cycle engine, within certain limits. The mixture formation takes place by the direct injection of the fuel into the cylinders or into the air situated in the cylinders, and not by external mixture formation, in which the fuel is introduced into the inducted air in the intake system.

Another example of optimizing the combustion process of an Otto-cycle engine consists in the use of an at least partially variable valve drive. By contrast to conventional valve drives, in which both the lift of the valves and the timing are invariable, these parameters which have an influence on the combustion process, and thus on fuel consumption, can be varied to a greater or lesser extent by means of variable valve drives. If the closing time of the inlet valve and the inlet valve lift can be varied, this alone makes throttling-free and thus loss-free load control possible. The mixture mass which flows into the combustion chamber during the intake process is then controlled not by means of a throttle flap but rather by means of the inlet valve lift and the opening duration of the inlet valve. Variable valve drives are however very expensive and are therefore often unsuitable for series production.

Yet another example approach includes partial cylinder deactivation, that is to say the deactivation of individual cylinders in certain load ranges. The efficiency of the Otto-cycle engine in part-load operation can be improved, that is to say increased, by means of a partial deactivation because the deactivation of one cylinder of a multi-cylinder internal combustion engine increases the load on the other cylinders, which remain in operation. During partial cylinder deactivation, if the engine power remains constant, the throttle flap may have to be opened further in order to introduce a greater air mass into operational cylinders, whereby dethrottling of the internal combustion engine may be attained. During the partial deactivation, the cylinders which are permanently in operation operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied. Further advantages with regard to efficiency are attained in that a deactivated cylinder, owing to the absence of combustion, does not generate any wall heat losses owing to heat transfer from the combustion gases to the combustion chamber walls.

Even though diesel engines (auto-ignition internal combustion engines), owing to the quality regulation on which they are based, exhibit greater efficiency, that is to say lower fuel consumption, than Otto-cycle engines in which the load is adjusted by means of throttling or quantity regulation with regard to the charge of the cylinders there is potential for improvement and a demand for improvement with regard to fuel consumption and efficiency.

One concept for reducing fuel consumption, also in the case of diesel engines, is cylinder deactivation, that is to say the deactivation of individual cylinders in certain load ranges. The efficiency of the diesel engine in part-load operation can be improved, by means of a partial deactivation, because, even in the case of the diesel engine, in the case of constant engine power the deactivation of at least one cylinder of a multi-cylinder internal combustion engine increases the load on the other cylinders still in operation, such that said cylinders operate in regions of higher loads, in which the specific fuel consumption is lower. The load collective in part-load operation of the diesel engine is shifted toward higher loads. With regard to the wall heat losses, the same advantages are attained as discussed above in relation to Otto-cycle engine.

In the case of diesel engines, the partial deactivation is also intended to prevent the fuel-air mixture from becoming too lean as part of the quality regulation in the event of decreasing load as a result of a reduction of the fuel quantity used. The multi-cylinder internal combustion engines with partial deactivation, and the associated methods for operating said internal combustion engines as used currently have considerable potential for improvement, as will be explained briefly below on the basis of a diesel engine as an example.

In a direct-injection diesel engine, if, for the purpose of the partial deactivation, the fuel supply to the deactivatable cylinders is stopped, that is to say discontinued, the deactivated cylinders continue to participate in the charge exchange if the associated valve drive of said cylinders is not deactivated or cannot be deactivated. The charge exchange losses thus generated lessen, and counteract, the improvements achieved with regard to fuel consumption and efficiency by means of the partial deactivation, such that the benefit of the partial deactivation is at least partially lost, that is to say the partial deactivation in fact yields an altogether less pronounced improvement.

In practice, it is often not expedient for the above-described disadvantageous effects to be remedied through the provision of switchable valve drives on the inlet side and on the outlet side, because switchable valve drives are very expensive and are generally not suitable for series production.

Furthermore, in the case of internal combustion engines supercharged by means of exhaust-gas turbocharging, switchable valve drives can lead to further problems because the turbine of an exhaust-gas turbocharger has to be configured for a certain exhaust-gas flow rate, and thus also for a certain number of cylinders. If the valve drive of a deactivated cylinder is deactivated, the overall mass flow through the cylinders of the internal combustion engine is reduced owing to the omission of the mass flow through the deactivated cylinders. The exhaust-gas mass flow conducted through the turbine decreases, and the turbine pressure ratio commonly also decreases as a result. This would have the effect that the charge pressure ratio likewise decreases, that is to say the charge pressure falls, and only a small amount of fresh air or charge air is or can be supplied to the cylinders that remain operational. The small charge-air flow may also cause the compressor to operate beyond the surge limit. In the context of the present disclosure, the expression charge air is used even if the internal combustion engine is not supercharged but is a naturally aspirated engine.

The effects described above lead to a restriction of the practicability of the partial deactivation, specifically to a restriction of the load range in which the partial deactivation can be used. A reduced charge-air flow rate that is supplied to the cylinders which are operational during the partial deactivation reduces the effectiveness or the quality of the combustion and has an adverse effect on the fuel consumption and pollutant emissions.

The charge pressure during a partial deactivation, and thus the charge-air flow rate supplied to the cylinders that remain operational, could for example be increased by means of a small configuration of the turbine cross section and by means of simultaneous exhaust-gas blow-off, whereby the load range relevant for a partial deactivation would also be expanded again. This approach however has the disadvantage that the supercharging behavior is inadequate when all the cylinders are operational.

The charge pressure during a partial deactivation, and thus the charge-air flow rate supplied to the cylinders that are still operational, could also be increased by virtue of the turbine being equipped with a variable turbine geometry, which permits an adaptation of the effective turbine cross section to the present exhaust-gas mass flow. The exhaust-gas back pressure in the exhaust-gas discharge system upstream of the turbine would then however simultaneously increase, leading in turn to higher charge-exchange losses in the cylinders that are still operational.

To counteract the above-described problems with regard to the low charge-air flow rate supplied to the cylinders that remain operational during the partial deactivation, a throttle element may be provided in the at least one intake line of each load-dependently switchable cylinder. By means of the throttle element, the size of the flow cross section of the intake line can be varied, whereby the charge-air flow rate supplied to the deactivated cylinder during partial deactivation of the internal combustion engine can be adjusted. In this way, it is possible for the supply of charge air to the deactivated cylinders, that is to say the charge-air flow rate supplied during partial deactivation, to be reduced and controlled, possibly even eliminated entirely, without the switchable cylinders having to be equipped with switchable valve drives, which entail high costs. In one embodiment, the cylinders which are operational during the partial deactivation may also be fitted with intake throttle elements instead of a variably actuated valve.

Through actuation of the throttle element provided in the intake line of a deactivated cylinder, the flow cross section of the intake line is varied, in particular reduced in size, whereby the charge-air flow rate supplied to the deactivated cylinder during the partial deactivation can be adjusted, metered and controlled.

As has already been described, the deactivated cylinders may continue to participate in the charge exchange because the associated non-switchable valve drive of said cylinders continues to be actuated, that is to say continues to operate, and is not deactivated together with the cylinders. The supply of charge air may however be reduced, as described above, by means of a throttle element. Less charge air or no charge air is supplied, in order that the charge exchange losses of the deactivated cylinders are reduced.

The reduced charge-air flow through the at least one deactivated cylinder leads (in relation to an unchanged charge-air flow with the intake line fully open) to reduced heat transfer owing to convection, such that the deactivated cylinders do not cool down, or cool down to a lesser extent, during the partial deactivation. This has advantages with regard to pollutant emissions, in particular with regard to the emissions of unburned hydrocarbons, because the deactivated cylinders reach or exhibit their operating temperature again immediately after the end of the partial deactivation.

The reduction of the charge-air flow by means of a throttle element has further advantages in relation to internal combustion engines in which the charge-air supply is prevented entirely by means of switchable valve drives, said further advantages resulting substantially from the fact that the mass flow through the internal combustion engine is greater in the case of a reduction of the charge-air supply than in the case of the supply of charge air being prevented entirely.

Advantages are obtained in the case of exhaust gas-turbocharged internal combustion engines. The greater mass flow leads to a higher turbine pressure ratio and thus to a higher charge pressure, such that a greater charge-air flow rate can be provided to the cylinders that are operational during partial deactivation. This also expands the range of applicability of the partial deactivation, specifically the load range in which partial deactivation can be used, and improves the quality of the combustion and thus the consumption and emissions characteristics of the internal combustion engine.

The inventors herein have identified the above issues and identified an approach by which the issues described above may be at least partly addressed. The disclosure relates to an internal combustion engine having at least two cylinders, in which each cylinder has at least one outlet opening which is adjoined by an exhaust line for discharging the exhaust gases via an exhaust-gas discharge system. Each cylinder has at least one inlet opening which is adjoined by an intake line for the supply of charge air via an intake system. At least two cylinders are configured in such a way that they form at least two groups wherein each group comprises of at least one cylinder. At least one cylinder of a first group is a cylinder which is operational even in the event of a partial deactivation of the internal combustion engine, and the at least one cylinder of a second group is formed as a load-dependently switchable cylinder. An inlet-side throttle element may be provided in the at least one intake line of the at least one load-dependently switchable cylinder. By means of the throttle element, the size of the flow cross section of the intake line can be varied, whereby the charge-air flow rate supplied to the at least one deactivated cylinder in the event of a partial deactivation of the internal combustion engine can be adjusted. Each outlet opening of a load-dependently switchable cylinder may be equipped with an at least partially variable valve drive, with an outlet valve which opens up or shuts off the outlet opening, an oscillating outlet valve realizing a valve lift $\Delta h$ between an open position and a closed position and opening up the associated outlet opening during an opening duration $\Delta t$.

In the case of the internal combustion engine according to the disclosure, in addition to the at least one inlet-side throttle element, which is provided in the intake system of the at least one load-dependently switchable cylinder, each outlet opening of a load-dependently switchable cylinder is equipped with an at least partially variable valve drive.

While the inlet-side throttle element controls the supply of charge air to a deactivated cylinder, that is to say reduces or possibly even eliminates the charge-air flow rate supplied during partial deactivation, an outlet valve actuated by means of an at least partially variable valve drive serves to prevent or reduce an undesired backflow of exhaust gas into a deactivated cylinder of the second group. Furthermore, the charge exchange losses of a deactivated cylinder can be reduced through suitable control of the outlet valve. The opening of an outlet valve should preferably be prevented when, in the associated deactivated cylinder, negative pressure prevails or a pressure prevails which is lower than that in the exhaust-gas discharge system.

An outlet valve is intended to control the discharge of the exhaust gas out of a cylinder, which is deactivated during partial deactivation of the internal combustion engine, of the second group. During partial deactivation, it is not hot exhaust gas but rather charge air or fresh air that is discharged. However, at least during the first working cycle of the partial deactivation, the exhaust gas of the preceding working cycle, and thus the hot exhaust gas of the most recent fired working cycle, is discharged via the exhaust-gas discharge system. Then, during the following working cycles of the partial deactivation, charge air or fresh air is discharged. Nevertheless, the discharge of hot exhaust gas will be referred to in the context of the present disclosure.

During partial cylinder deactivation, the outlet valve of the second group (switchable) of cylinders may be regulated to control the engine temperature. In one example, if during engine operation with partial cylinder deactivation, there is a drop in engine temperature, the outlet valve may be opened to a degree to allow warm exhaust to enter the cylinders thereby increasing engine temperature. In another example, the intake throttle element(s) and the outlet valve(s) may be regulated to prevent surge.

The internal combustion engine according to the disclosure has at least two cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the disclosure. Within the context of a partial deactivation, the three cylinder groups may be activated or deactivated in succession, whereby two-time switching may also be realized. The partial deactivation is thereby further optimized. The cylinder groups may also comprise a different number of cylinders.

The embodiment of the internal combustion engine optimizes the efficiency of the internal combustion engine in part-load operation, that is to say at low loads, wherein a low load $T_{low}$ is preferably a load which amounts to less than 50%, preferably less than 30%, of the maximum load $T_{max,n}$ at the present engine speed n.

In one example, at least one inlet-side throttle element in the internal combustion engine, is a valve. In another example, the inlet-side throttle element may be a pivotable flap. In yet another example, inlet-side throttle element may be continuously adjustable. The configuration of the throttle element as a continuously adjustable throttle element permits precise dosing of the charge-air flow rate introduced into the deactivated cylinders. The metering of the charge-air flow rate may be performed in an operating point-specific manner, in particular with regard to the lowest possible charge exchange losses and/or a required charge pressure. The control of the throttle element may take into consideration the load T, the engine speed n, the coolant temperature in the case of a liquid-cooled internal combustion engine, the oil temperature and other engine operating parameters. In a further example, the throttle element may be switchable in two-stage or multi-stage fashion. The throttle element may be electrically, hydraulically, pneumatically, mechanically or magnetically controllable, by means of an engine controller.

Embodiments of the internal combustion engine are advantageous in which a supercharging arrangement is provided. In this case, embodiments of the internal combustion engine are advantageous in which at least one exhaust-gas turbocharger is provided which comprises a turbine arranged in the exhaust-gas discharge system and a compressor arranged in the intake system.

The advantage of the exhaust-gas turbocharger for example in relation to a mechanical charger is that no mechanical connection for transmitting power is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

Supercharged internal combustion engines are preferably equipped with a charge-air cooling arrangement by means of which the compressed combustion air is cooled before it enters the cylinders. In this way, the density of the supplied charge air is increased further. In this way, the cooling likewise contributes to a compression and improved charging of the combustion chambers, that is to say to an improved volumetric efficiency. It may be advantageous for the charge-air cooler to be equipped with a bypass line in order to be able to bypass the charge-air cooler if required, for example after a cold start.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible, given the same vehicle boundary conditions, to shift the load collective toward higher loads, at which the specific fuel consumption is lower.

Problems are encountered in the configuration of the exhaust-gas turbocharging, wherein it is basically sought to obtain a noticeable performance increase in all engine speed ranges. A severe torque drop is commonly observed in the event of a certain engine speed being undershot. The torque characteristic of a supercharged internal combustion engine can be improved through various measures, for example by virtue of a plurality of superchargers—exhaust-gas turbochargers and/or mechanical superchargers being provided in a parallel and/or series arrangement in the exhaust-gas discharge system.

At least one exhaust-gas aftertreatment system, for example an oxidation catalytic converter, a three-way catalytic converter, a storage catalytic converter, a selective catalytic converter and/or a particle filter, may be provided in the exhaust-gas discharge system.

In the case of internal combustion engines having four cylinders in an in-line arrangement, the two outer cylinders and the two inner cylinders may form in each case one group.

At least one exhaust-gas recirculation (EGR) arrangement may be provided to the internal combustion engine. EGR comprises a recirculation line which branches off from the exhaust-gas discharge system and issues into the intake system. EGR is a suitable means for reducing the nitrogen oxide emissions. EGR rate $x_{EGR}$ may be determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air which, if appropriate, is conducted through a compressor and compressed. To obtain a considerable reduction in nitrogen oxide emissions, high exhaust-gas recirculation rates are required which may be of the order of magnitude of $x_{EGR}\approx 60\%$ to 70%. A valve may arranged in the recirculation line of the EGR arrangement for adjusting the EGR flow rate.

In the case of internal combustion engines having at least one exhaust-gas turbocharger and an exhaust-gas recirculation arrangement, embodiments are advantageous in which the recirculation line of the exhaust-gas recirculation arrangement branches off from the exhaust-gas discharge system upstream of the turbine of the at least one exhaust-gas turbocharger and issues into the intake system downstream of the compressor. In the case of said so-called high-pressure EGR arrangement, the exhaust gas is extracted from the exhaust-gas discharge system upstream of the turbine and is fed into the intake system downstream of the compressor, whereby the exhaust gas need not be subjected to exhaust-gas aftertreatment, in particular supplied to a particle filter, before being recirculated, because there is no risk of fouling of the compressor.

In the case of the operation of an internal combustion engine with exhaust-gas turbocharging and the simultaneous use of high-pressure EGR, a conflict may however arise because the recirculated exhaust gas is no longer available for driving the turbine. In the event of an increase in the exhaust-gas recirculation rate, the exhaust-gas flow introduced into the turbine decreases. The reduced exhaust-gas mass flow through the turbine leads to a lower turbine pressure ratio, as a result of which the charge-pressure ratio also falls, which equates to a smaller charge-air flow.

In order to overcome the above mentioned issue, low-pressure EGR may be used. By contrast to high-pressure EGR, in the case of low-pressure EGR, exhaust gas which has already flowed through the turbine is introduced into the intake system. For this purpose, the low-pressure EGR arrangement has a recirculation line which branches off from the exhaust-gas discharge system downstream of the turbine and issues into the intake system preferably upstream of the compressor. The exhaust gas which is recirculated via the low-pressure EGR arrangement to the inlet side is mixed with fresh air. The mixture of fresh air and recirculated exhaust gas produced in this way forms the charge air which is supplied to the compressor and compressed.

Since, within the low-pressure EGR arrangement, exhaust gas is commonly conducted through the compressor, said exhaust gas must be previously subjected to exhaust-gas aftertreatment, in particular in a particle filter. Depositions in the compressor which change the geometry of the compressor, in particular the flow cross sections, and thereby impair the efficiency of the compressor, must be prevented.

For the reasons stated above, embodiments of the internal combustion engine are advantageous in which the recirculation line of the exhaust-gas recirculation arrangement branches off from the exhaust-gas discharge system downstream of the turbine of the at least one exhaust-gas turbocharger and issues into the intake system upstream of the compressor.

In the case of internal combustion engines in which each cylinder has at least two inlet openings, the intake lines of each cylinder of the second group may merge to form a partial intake line, and each partial intake line may be equipped with an inlet-side throttle element. In one embodiment, a single throttle element is sufficient to reduce or stop the supply of charge air to a deactivated cylinder, specifically even if the switchable cylinder has more than one inlet opening, that is to say has at least two inlet openings and thus at least two intake lines.

In the case of internal combustion engines in which the second cylinder group has at least two inlet openings, the intake lines of the second cylinder group may merge to form an overall intake line, thus forming an inlet manifold, and said inlet manifold is equipped with at least one inlet-side throttle element. An inlet-side throttle element may be arranged in the overall intake line of the inlet manifold. A single throttle element may be sufficient to reduce or stop the charge-air supply to the deactivated cylinder group.

In another embodiment, a throttle element may be provided in each intake line of a deactivatable cylinder, though this increases the number of throttle elements required, in particular if the cylinders have more than one inlet opening and/or the second group comprises more than one deactivatable cylinder.

Each outlet valve may be associated with an at least partially variable valve drive which is adjustable with regard to the valve lift $\Delta h$. A lifting valve which is adjustable in terms of the valve lift $\Delta h$ exhibits the normal lift in the case of activated cylinders. Furthermore, a lifting valve of said type permits at least one further actuation with reduced lift. That is to say, a lifting valve which is adjustable in the above sense is a lifting valve which permits at least two different valve lifts $\Delta h_1$, $\Delta h_2$. A switchable valve which exhibits zero lift in the deactivated state is thus likewise a valve which is adjustable in terms of valve lift Δh. In one embodiment the outlet valve in question may not be a deactivatable valve.

Each outlet valve may be associated with an at least partially variable valve drive which is adjustable with regard to the opening duration Δt. A lifting valve which is adjustable in the above sense then makes it possible to realize at least two different opening durations $Δt_1$, $Δt_2$. In the case of an activated cylinder group, it is basically the case that a normal opening duration is realized, that is to say an opening duration such as for example the opening duration of the outlet openings of the other first cylinder group. Furthermore, at least one further actuation with a shortened opening duration is possible. A deactivated valve, which is not actuated and thus not opened, has an opening duration of zero. In one embodiment, the outlet valve in question may not be a deactivatable valve. Thereby, each outlet valve may be associated with an at least partially variable valve drive which is adjustable with regard to the valve lift Δh and the opening duration Δt. Each outlet valve associated with an at least partially variable valve drive may be a valve which is adjustable in stepped fashion. As mentioned above, a lifting valve which is adjustable in stepped fashion, in particular two-stepped fashion may be used.

In one example, each outlet valve associated with an at least partially variable valve drive is a continuously adjustable valve. A continuously adjustable outlet valve permits more flexible control of the exhaust-gas flow and/or of the charge-air flow out of a deactivated cylinder.

Each inlet-side throttle element may be arranged as close as possible to the associated cylinder. The smaller the line volume between a throttle element and the associated inlet opening, the more advantageous this is for the operation of the internal combustion engine, especially for the activation and deactivation of the cylinders of the second group.

At least one switchable cylinder of the second group may be switched as a function of the load T of the internal combustion engine, in such a way that at least one switchable cylinder is deactivated if a predefinable load $T_{down}$ is undershot and is activated if a predefinable load $T_{up}$ is exceeded. The charge-air flow rate supplied to the at least one deactivated cylinder during the partial deactivation may be reduced by actuation of the at least one inlet-side throttle element.

The limit loads $T_{down}$ and $T_{up}$ predefined for the undershooting and exceedance respectively may be of equal magnitude, though may also differ in magnitude. When the internal combustion engine is in operation, the cylinders of the first cylinder group are cylinders which are permanently in operation. Switching of the second cylinder group, that is to say an activation and deactivation of said second group, takes place. At least one cylinder of the second group may be deactivated when the predefined load $T_{down}$ is undershot and the present load remains lower than said predefined load $T_{down}$ for a predefinable time period $Δt_1$.

The introduction of an additional condition for the deactivation of the cylinders of the second group, that is to say the partial deactivation, is intended to prevent excessively frequent activation and deactivation, if the load falls below the predefined load $T_{down}$ only briefly and then rises again, or fluctuates around the predefined value for the load $T_{down}$, without the undershooting justifying or necessitating a partial deactivation. Thereby at least one cylinder of the second group is activated when the predefined load $T_{up}$ is exceeded and the present load remains higher than said predefined load $T_{up}$ for a predefinable time period $Δt_2$.

Fuel supply to the at least one switchable cylinder may be deactivated in the event of deactivation. This yields advantages with regard to fuel consumption and pollutant emissions, thus assisting the aim pursued by the partial deactivation, specifically that of reducing fuel consumption and improving efficiency. In the case of auto-ignition internal combustion engines, it may even be necessary to deactivate the fuel supply in order to reliably prevent an ignition of the mixture situated in the cylinder.

Upon deactivation of the at least one load-dependently switchable cylinder, the fuel supply of the at least one switchable cylinder may firstly be deactivated before the at least one inlet-side throttle element is actuated. Also, upon activation of the at least one deactivated cylinder, the at least one inlet-side throttle element may firstly be actuated before the fuel supply of the at least one deactivated cylinder is activated.

This approach ensures stable transient operating behavior of the turbocharger of a supercharged internal combustion engine and of the internal combustion engine itself, and makes allowance for the fact that the fuel supply of the internal combustion engine can be deactivated and reactivated directly, that is to say with little time delay, whereas, during the course of the partial deactivation, that is to say upon deactivation of the switchable cylinders and upon reactivation of the deactivated cylinders, the turbocharger responds only with a certain time delay, that is to say reacts in a delayed manner to changes. At least one cylinder which is in operation may be fired by means of auto-ignition. The above method variant relates to methods in which the combustion is initiated by means of auto-ignition, and thus also to operating processes such as are conventionally used in diesel engines.

Each cylinder may be equipped with an ignition device for the initiation of an applied ignition, wherein the ignition device of the at least one switchable cylinder may be preferably deactivated in the event of deactivation. The above method variant relates to the use of the method in the case of an applied-ignition internal combustion engine, for example a direct-injection Otto-cycle engine, the cylinders of which are equipped in each case with an ignition device for initiating an applied ignition.

It is however also possible, for the operation of an Otto-cycle engine, to use a hybrid combustion process with auto-ignition, for example the Homogeneous charge compression ignition (HCCI) method, which is also referred to as the spatial ignition method or as the cold air intake (CAI) method. Said method is based on a controlled auto-ignition of the fuel supplied to the cylinder. Here, the fuel (as in the case of a diesel engine) is burned with an excess of air, that is to say superstoichiometrically. The lean-burn Otto-cycle engine, owing to the low combustion temperatures, has relatively low nitrogen oxide emissions and, likewise owing to the lean mixture, has no soot emissions. Furthermore, the HCCI method leads to high thermal efficiency. Here, the fuel may be introduced both directly into the cylinders and also into the intake pipe.

The predefinable load $T_{down}$ and/or $T_{up}$ may be dependent on the engine speed n of the internal combustion engine. Then, there is not only one specific load, upon the undershooting or exceedance of which switching takes place regardless of the engine speed n. Instead, an engine-speed-dependent approach is followed, and a region in the characteristic map is defined in which partial deactivation takes place. Other operating parameters of the internal combustion engine, for example the engine temperature or the coolant temperature after a cold start of the internal combustion engine may be taken into consideration as a criterion for a partial deactivation.

A predefinable minimum amount of charge air, and no less, may be supplied to the at least one deactivated cylinder. In this respect, a valve arranged in the intake line of a switchable cylinder is not completely closed during the partial deactivation or in the event of a partial deactivation. If a flap is used as a throttle element, it is not a disadvantage that said flap exhibits a leakage flow in the closed position.

The charge-air flow rate supplied to the at least one deactivated cylinder may be co-determined by the load T, the engine speed n, the coolant temperature, the oil temperature, the engine temperature and/or the like.

BRIEF DESCRIPTION OF THE DRAWINGS

FIG. 4 shows an example operation of a switchable cylinder in an internal combustion engine.

DETAILED DESCRIPTION

Figure 1:
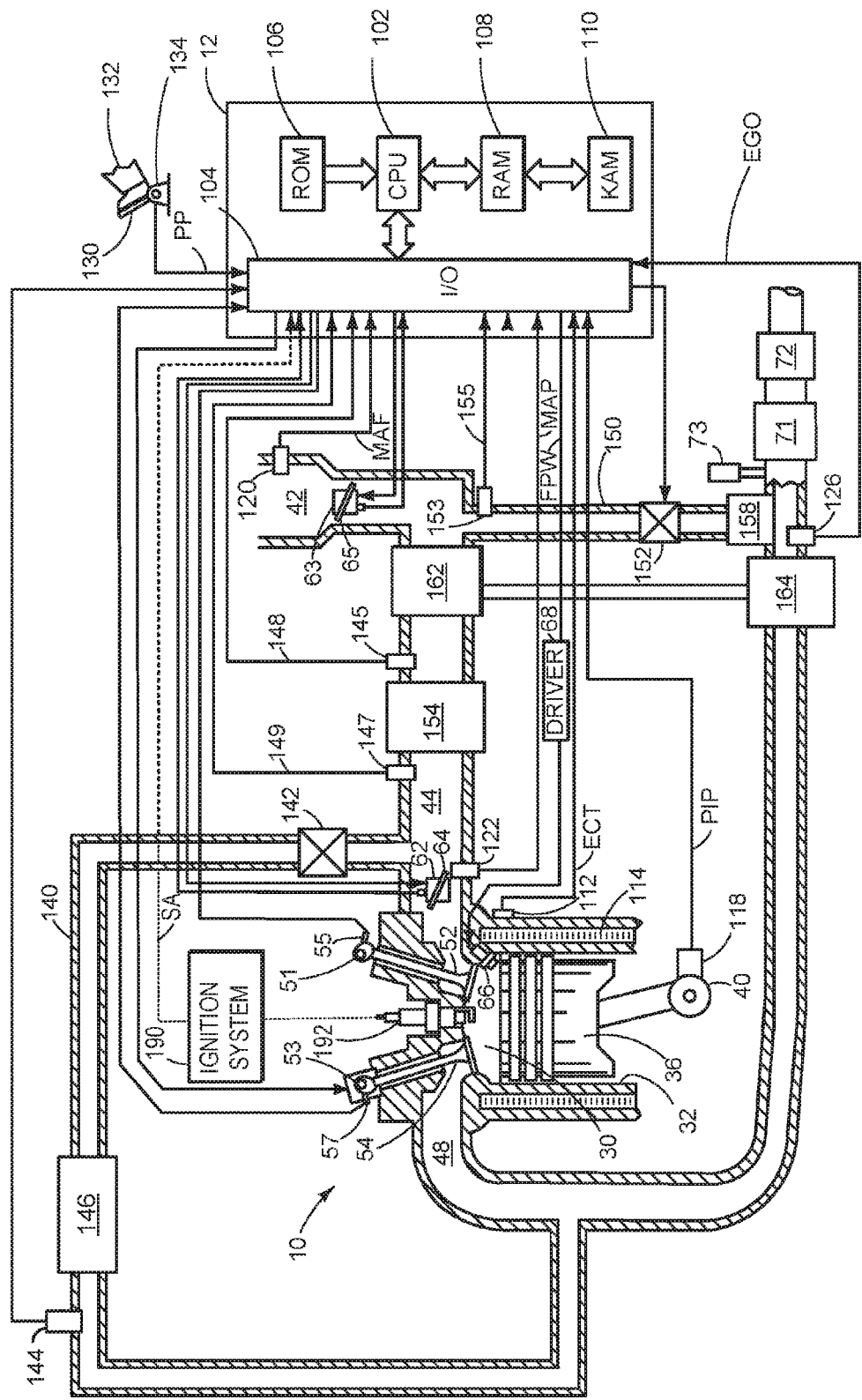
FIG. 1 shows an example cylinder of an engine in accordance with the present disclosure.

Referring now to FIG. 1, a schematic diagram 100 of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake throttle elements and/or two or more exhaust valves. Cylinder 30 may be a selectively deactivatable cylinder of engine 10. As elaborated with reference to FIG. 2, cylinder 30 may be a cylinder of second cylinder group (cylinders 2 and 3), distinct from a cylinder of first cylinder group (cylinders 1 and 4). During conditions when engine load is less than a threshold, cylinder 30 of second cylinder group may be selectively deactivated while cylinder(s) of the of first cylinder group are maintained active. Cylinder 30 may be deactivated by deactivating fueling of the cylinder. In addition, as elaborated below, exhaust valves may be deactivated while maintaining intake valves active, and while restricting intake charge flow to the deactivated cylinder via a throttle element.

Intake valve 52 may be controlled by controller 12 via valve actuator 51. Similarly, exhaust valve 54 may be controlled by controller 12 via valve actuator 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. The intake valve 52 may be coupled to and actuated by a fixed cam and therefore may be a non-adjustable valve. For example, via the fixed cam profile, the intake valve may be shifted between a fully open and a fully closed position. By enabling selective deactivation of a cylinder without requiring a variable valve actuation mechanism for the intake valves, component and cost reduction may be achieved.

The exhaust valves may be actuated by one or more cams, and may utilize one or more of cam profile switching (CPS), variable cam timing (VCT), and variable valve timing (VVT) and/or variable valve lift (VVL) systems to vary valve operation. The valve opening of the exhaust valve may be adjusted to any position between valve full open and full closed positions. The variable valve actuator of the exhaust valves may be electric, electro hydraulic or any other conceivable mechanism to enable valve actuation. During deactivation of a cylinder, a variable valve drive coupled to the exhaust valve may be actuated to fully close the valve, or hold the valve at least partially closed for the duration of the selective deactivation, thereby reducing pumping losses and reducing exhaust backpressure issues.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. Combustion chamber 30 or one or more other combustion chambers of engine 10 may be operated in a compression ignition mode, with or without an ignition spark. Each cylinder may be fitted with a direct injection system for introducing fuel. In this case, embodiments in which each cylinder is fitted with an injection nozzle for the purpose of direct injection may be advantageous. During partial engine shutdown (e.g., responsive to low engine load conditions), the fuel supply to a deactivatable cylinder can be deactivated more quickly and more reliably in the case of direct-injection internal combustion engines than in the case of internal combustion engines with intake manifold injection, in which fuel residues in the intake manifold can lead to unwanted combustion in the cylinder that has been switched off. Nonetheless, embodiments of the internal combustion engine in which intake manifold injection (e.g., into an intake port of the cylinder) may be provided for the purpose of fuel supply can be advantageous.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The throttling elements may, in an alternative embodiment, be continuously variable, and may further comprise a pivotable flap or valve. Throttling element 62 may be in an intake line specific to a single cylinder, for example the inner two cylinders of a four cylinder in-line engine. In the particular example of a four cylinder in-line engine throttling element 62 may or may not be coupled to the intake line of the outer cylinders. The positions of throttle plates 64 and 65 may be provided to controller 12 by throttle position signals TP.

Throttle 63 enables air flow to all engine cylinders to be controlled. In comparison, throttle 62 controls air flow to selectively deactivatable cylinder 30 during partial shutdown of the engine. In particular, during low load conditions, when the cylinder is to be shutdown, fueling of the cylinder may be deactivated, and also exhaust valves may be deactivated by actuating a variable valve mechanism coupled to the exhaust valve while the intake valves continue to pump air through the deactivated cylinder. To reduce air flow to the deactivated cylinder during the deactivation, throttle 63 may be controlled, for example, the throttle may be fully closed or at least partially closed. Further, while the selected cylinder is held deactivated, an opening of the throttle 63 may be adjusted responsive to changes in operating conditions, such as changes to engine load. For example, as the engine load increases, while holding the selected cylinder deactivated, throttle 63 may be closed further to reduce pumping losses.

Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

In one example, the throttling element of throttle 62 may be a valve. In another example, the throttling element may be a pivotable flap. In yet another example, the throttling element may be continuously variable. Embodying the throttling element as a continuously variable throttling element allows precise metering of the charge air quantity introduced into the cylinders that have been switched off. The charge air quantity can be chosen specifically for the operating point, in particular with a view to minimum exhaust and refill losses and/or a required boost pressure. The control of the throttling element can take account of the load T, the engine speed n, the coolant temperature in the case of a liquid-cooled internal combustion engine, or the oil temperature, as examples. Embodiments of the internal combustion engine in which the throttling element can be switched in two stages or multiple stages can also be advantageous. The throttling element can be suitable for electric, hydraulic, pneumatic, mechanical or magnetic control, preferably by an engine controller.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 62. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 162. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, diesel oxidation catalyst, diesel particular filter or combinations thereof. For example, device 71 may be a diesel oxidation catalyst and device 72 may be a diesel particulate filter (DPF) (also referred to herein as a soot filter). A urea injector 73 may be arranged upstream of the emission control devices and introduces urea (e.g., diesel exhaust fluid/DEF) into the exhaust passage as a reducing agent during regeneration of catalysts. In some embodiments, DPF 72 may be located downstream of diesel oxidation catalyst 71 (as shown in FIG. 1), while in other embodiments, DPF 72 may be positioned upstream of diesel oxidation catalyst (not shown in FIG. 1).

Embodiments of the internal combustion engine in which at least one exhaust gas aftertreatment system is provided in the exhaust system may be advantageous; e.g. an oxidation catalyst, a three-way catalyst, a storage catalyst, and a selective catalyst and/or a particulate filter.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows one cylinder of a multi-cylinder engine, and that each cylinder may similarly include its own set of intake/exhaust valves, fuel injector, spark plug, etc.

Figure 2:
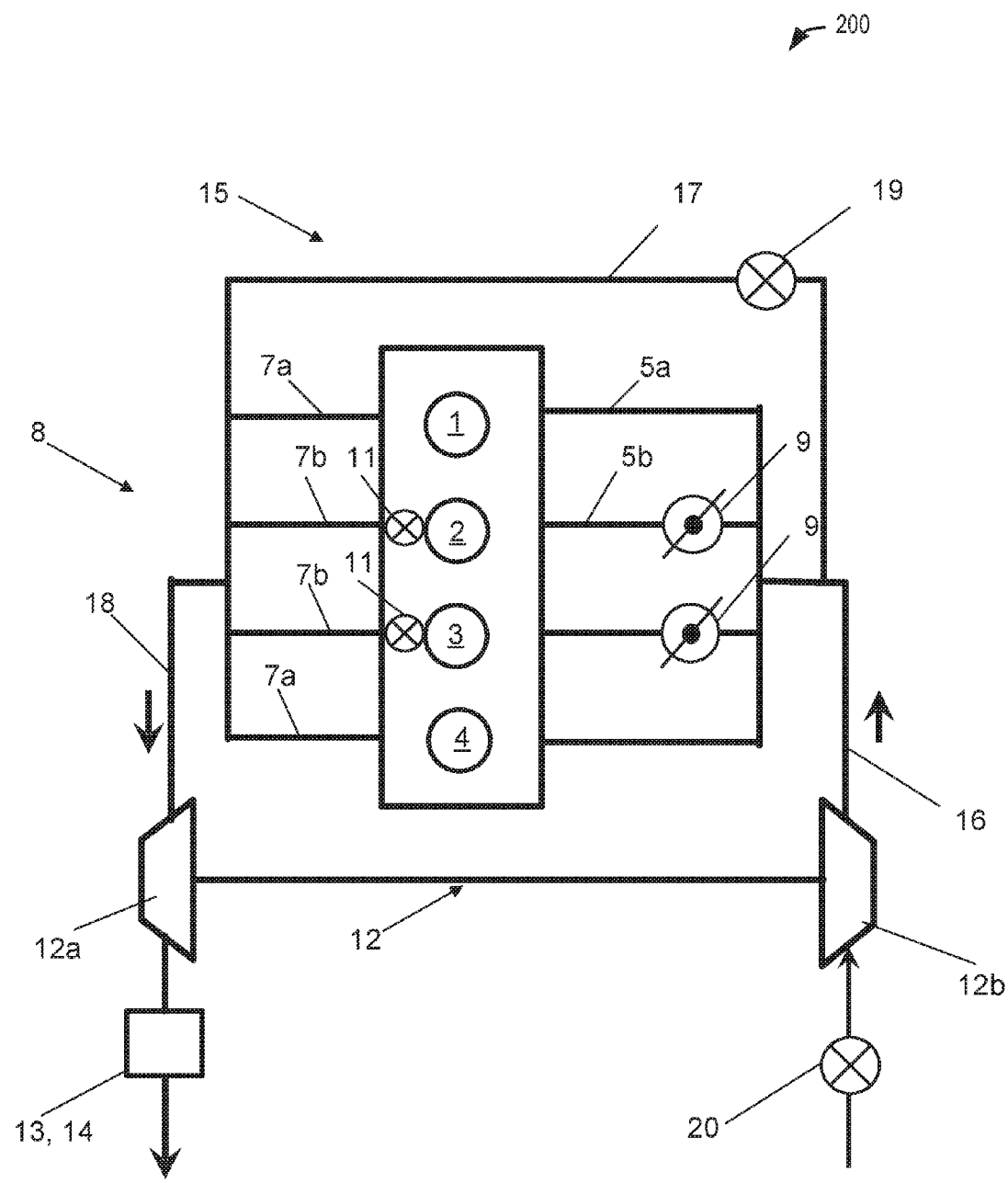
FIG. 2 shows a schematic of a first embodiment of an auto-ignition internal combustion engine.

Turning now to FIG. 2, a four-cylinder in-line engine 200 (such as multi-cylinder engine 10 of FIG. 1) is shown. The engine 200 comprises direct injection, in which the four cylinders 1, 2, 3, 4 are arranged along the longitudinal axis of the cylinder head, e.g., in line, and are each fitted with an injector (such as injector 66 in FIG. 1) for injecting fuel, wherein the injected fuel quantity is used to adjust the air-fuel ratio A. The cylinder 30 of FIG. 1 may be an example a single cylinder of a four cylinder in-line engine such as shown in FIG. 2.

Each cylinder 1, 2, 3, 4 may have an intake line 5a, 5b for the supply of charge air via an intake system 6, and an exhaust line 7a, 7b for the discharge of the exhaust gases via an exhaust-gas discharge system 8.

The internal combustion engine 200 is, for the purposes of supercharging, equipped with an exhaust-gas turbocharger 12, wherein the turbine 12a is arranged in an overall exhaust line 18 of the exhaust-gas discharge system 8, and the compressor 12b is arranged in an overall intake line 16 of the intake system 6. A throttle element 20 may be coupled to the intake line 16 upstream of the compressor 12b. The fresh air supplied to the internal combustion engine 200 is compressed in the compressor 12b, for which purpose the enthalpy of the exhaust-gas flow is utilized in the turbine 12a. For the aftertreatment of the exhaust gas, a particle filter 14 which serves as exhaust-gas aftertreatment system 13 is provided in the overall exhaust line 18 downstream of the turbine 12a.

The internal combustion engine 200 is furthermore equipped with an exhaust-gas recirculation arrangement 15, specifically with a high-pressure EGR arrangement. For this purpose, a recirculation line 17 branches off from the exhaust-gas discharge system 8 upstream of the turbine 12a and opens into the intake system 6 downstream of the compressor 12b. A valve 19 for adjusting the recirculated exhaust-gas flow rate is arranged in the recirculation line 17 of the exhaust-gas recirculation arrangement 15.

The four cylinders 1, 2, 3, 4 are configured and form two groups with in each case two cylinders 1, 2, 3, 4, wherein the two outer cylinders 1, 4 form a first group, the cylinders 1, 4 of which are in operation even in the event of a partial deactivation of the internal combustion engine 200, and the two inner cylinders 2, 3 form a second group, the cylinders of which are formed as cylinders 2, 3 which can be switched in a load-dependent manner and which are deactivated during a partial deactivation.

In the intake lines 5b of the two inner cylinders 2, 3, there are provided inlet-side throttle elements 9, by means of which the charge-air flow rate supplied to the deactivated cylinders 2, 3 is adjusted by virtue of the size of the flow cross section of the intake line 5b being varied. Intake throttle elements similar to throttle element 9 may also be provided to the outer cylinders 1 and 4. In one example, the intake throttle element 9 may be the throttle element 62 as described in FIG. 1.

The cylinders 2, 3 of the second group are in the present case in the form of activatable cylinders 2, 3 which, in part-load operation, in the event of a predefinable load being undershot, are deactivated, specifically by virtue of the flow cross section of their intake lines 5b being reduced in size by means of a throttle element 9 and the fuel injection being deactivated. The load demand on the cylinders 1, 4 of the first group, which remain in operation, is increased in this way, which cylinders are then operated at higher loads with a lower specific fuel consumption. This results in an improvement in efficiency. The intake valve (such as the intake valve 52 in FIG. 1, not shown in FIG. 2) of the at least one cylinder of the second cylinder group is coupled to a fixed valve drive. The intake valve may have a fixed cam and may be only maintained in fully open and closed positions.

Each outlet opening of a load-dependently switchable cylinder 2, 3 is equipped with an at least partially variable valve drive 11, which serves for the actuation of an associated outlet valve. The controller may actuate the variable valve drive to oscillate the exhaust valve to realize a valve lift $\Delta h$ between an open position and a closed position of the exhaust valve, and to open up the outlet of the at least one cylinder of the second cylinder group for an opening duration Δt. The variable valve drive may vary a lift of the exhaust valve is one of a continuously adjustable and a stepped fashion.

Each outlet valve associated with a cylinder 2, 3 of the second group is a valve by means of which the discharge of the exhaust gas and/or of the charge air out of the associated deactivated cylinder 2, 3 can be controlled. The outlet valves are intended to prevent the inflow of exhaust gas or of charge air into the deactivated cylinders 2, 3 of the second group at the outlet side. Furthermore, the charge exchange losses of the deactivated cylinders 2, 3 can be reduced through suitable control of the outlet valves. In one example, similar outlet variable valve drives may be present in all four cylinders.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Figure 3:
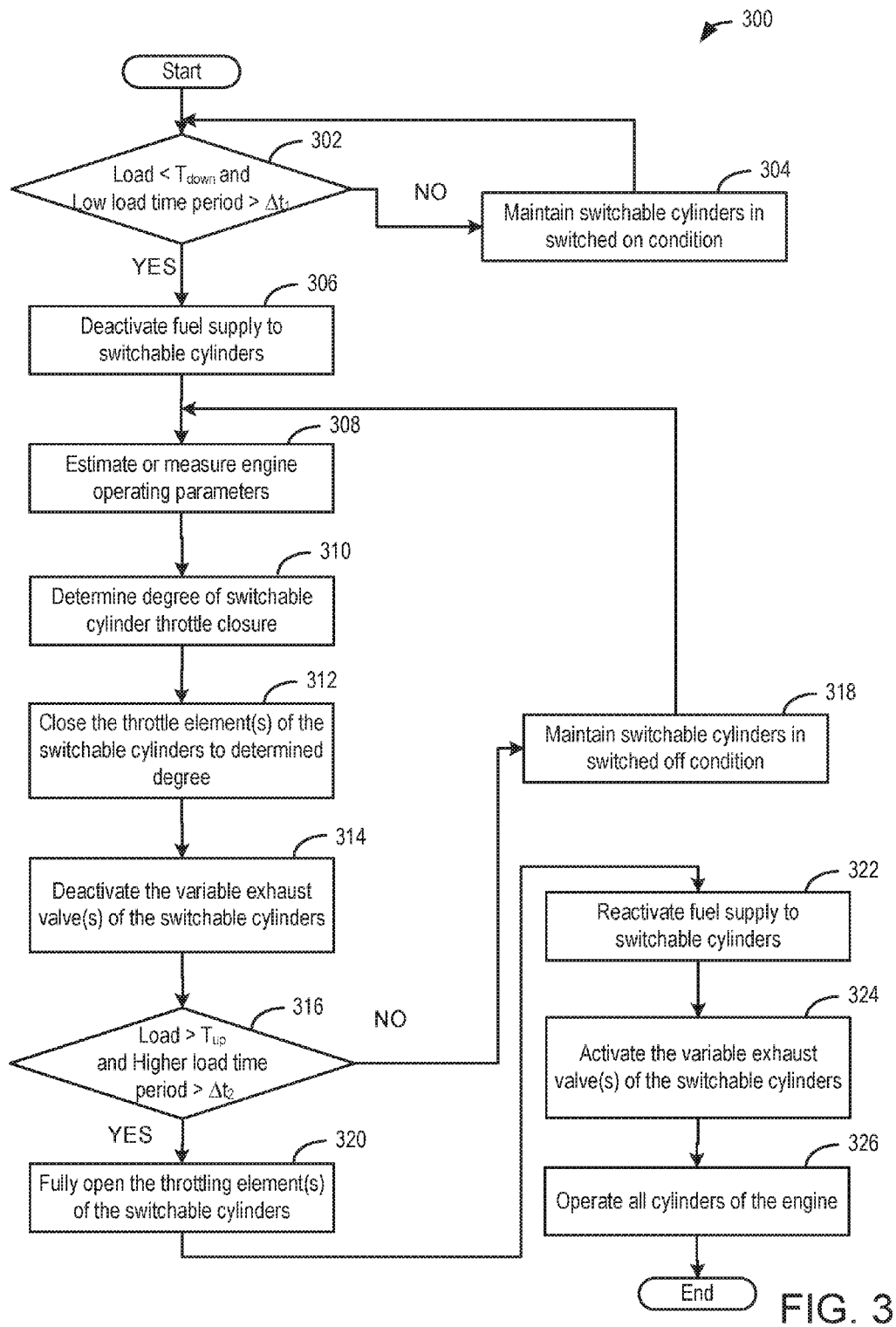
FIG. 3 shows a flow chart illustrating a method to be implemented during a partial deactivation of the internal combustion engine.

FIG. 3 illustrates an example method 300 to be implemented during a partial deactivation of the internal combustion engine. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, it is determined if the load is less than a first predetermined threshold load $T_{down}$ and if the time period for which the load is lower than the threshold load is greater than a predetermined first time period $\Delta t_1$. If the load decreases below the threshold for a short period of time, it may not be advantageous to partially deactivate cylinders. In this way each of load and duration of low load operation may be taken into consideration for determining partial cylinder deactivation. If current load is higher than the load threshold or the duration of low load condition is lower than the predetermined time period $\Delta t_1$, at 304, the switchable cylinders may be maintained in switched on conditions. Fuel combustion may actively take place in each of the cylinders in the engine.

If it is determined that the current load is lower than the load threshold and the duration of low load condition is higher than the predetermined time period $\Delta t_1$, at 306, the fuel supply to the switchable cylinders is deactivated in order to switch the cylinders off. After, or concurrently with fuel deactivation to the switchable cylinders (such as cylinders 2 and 3 in FIG. 2) engine operating parameters are estimated or measured at 308. This may include measurements from MAP, UEGO, hall effect and other sensors described in reference to FIG. 1. Engine operating parameters including engine load, speed, air-fuel ratio, exhaust temperature, manifold absolute pressure and oxygen content may be estimated.

The engine operating parameters estimated at 308 may be taken into account at 310 in order to determine a degree of intake throttle (such as the intake throttle element 62 and 9 as shown in FIGS. 1 and 2 respectively) closure. The throttle(s) of the switchable cylinder(s) may be closed to a determined degree to reduce pumping losses during cylinder shut off. The throttling elements may, for example, be further closed as engine load increases (during partial engine shutdown). The degree of throttling may further be dependent on a desired boost pressure. The degree of throttle closure may vary between fully closed, and fully open.

At 312, the controller may send a signal to an actuator attached to the throttle element(s) (located in the intake line of the switchable cylinder(s)) to close the throttle element(s) to the predetermined degree (from step 310). Gradual closure of the throttling element may prevent rapid changes to exhaust flow which may result in pressure differentials in a turbocharger, changes to EGR composition or aircharge pressure.

At 314, the controller may send a signal to an actuator of the variable exhaust valve(s) of the switchable cylinders in order deactivate the exhaust valve(s) and maintain the valve(s) in closed position. Alternatively, the exhaust valve may not be fully deactivated during partial cylinder deactivation but the opening may be regulated based on engine operations. This may prevent or reduce an undesired backflow of exhaust in to a deactivated (switchable) cylinder. The closing of the exhaust valve is of significance especially during conditions when the deactivated cylinders are under negative pressure or the pressure in these cylinders is lower than that in the exhaust-gas discharge system. In addition, by regulating the exhaust valve of the switchable cylinders charge exchange losses may be reduced.

During partial shutdown of the engine, fueling of the second group of cylinders may be deactivated while maintaining a first group of cylinders active. After deactivating cylinder fueling, the throttle element(s) may be closed, and the variable valve drive may be actuated to deactivate the exhaust valve. An order of closing the throttle element, deactivating the fuel, and actuating the variable valve drive may vary based on engine operating conditions, engine configuration, etc. As one example, after deactivating the fuel to a cylinder of the second group, the throttle element(s) may be actuated to a closed position before completion of an exhaust stroke, and then the exhaust valves may be deactivated via the variable valve drive. In another example, after deactivating the fuel, the cylinder may be allowed to complete an exhaust stroke. Then, after the exhaust stroke, the exhaust valves may be deactivated and then the throttle element may be actuated to the closed position. In yet another example, the fueling of the second group of cylinders may be deactivated followed by deactivation of exhaust valves of the second group of cylinders after completing an exhaust stroke while maintaining intake valves of the second group of cylinders active; and after deactivating the exhaust valves, a throttle element in an intake line of the second group of cylinders may be closed. In a further example, the throttle element(s) may be closed after deactivating the fuel and the exhaust valves may be deactivated before an exhaust stroke following the throttle element closing. During partial shutdown of the engine, when the exhaust valves are deactivated, the intake valves may continue to pump air and remain active.

During partial engine deactivation, if the engine temperature drops below a threshold, the variable exhaust valve may be activated for a short duration in order to admit warm exhaust into the cylinder(s), thereby increasing the engine temperature. In addition, during conditions such as tip-out, the pressure ratio may approach or move beyond a surge limit of the compressor. During surge, the noise-vibrationharshness (NVH) levels may increase and measures are required to be taken in order to reduce the pressure ratio to well below the surge limit, and improve compressor flow. During such conditions, the throttle elements and the exhaust valves of the switchable cylinders may be opened in order to increase forward flow through the compressor from the intake manifold to the exhaust manifold.

At 316, it is determined if the engine load is greater than a second predetermined threshold load $T_{up}$ and if the time period for which the load is higher than the threshold load is greater than a predetermined second time period $\Delta t_2$. As the engine load increases, the switchable cylinders may be required to be reactivated. In one example the first and the second threshold loads ($T_{down}$ and $T_{up}$) may be of equal value and the first and second time periods ($\Delta t_1$ and $\Delta t_2$) may also be of equal value. If it is determined that current load is lower than the second predetermined threshold load or if the time period for which the load is higher than the threshold load is less than the predetermined time period $\Delta t_2$, at 318, the switchable cylinders may be maintained in switched off conditions. Continuous adjustments to the degree of closure for each of the throttle and the exhaust valve may be made.

If it is determined that the conditions in step 316 are met, at 320, the controller may send a signal to an actuator attached to the throttle element(s) corresponding to the switchable cylinders in order to actuate the throttle element(s) to open position. Also, at 322, fuel supply may be reactivated in the switchable cylinders. In addition, at 324, the controller may send a signal to an actuator of the variable exhaust valve(s) to activate the variable exhaust valve(s). In one example, in response to cylinder reactivation conditions being met, fuel supply may be selectively reactivated to the second group of cylinders while actuating the variable valve mechanism to reactivate the exhaust valves of the second group of cylinders; and then the throttle element may be opened. For example, after resuming cylinder fueling, the exhaust valves may be reactivated, and then, after an intake stroke of the cylinder has been completed, the throttle element may be opened. Actuating the variable valve mechanism to deactivate the exhaust valves includes reducing a valve lift of the exhaust valves for a duration of the deactivation, and actuating the variable valve mechanism to reactivate the exhaust valves includes increasing the valve lift of the exhaust valves while resuming cylinder fueling. At 326, all the cylinders may be operated by combustion of fuel. Each of the throttle element and the exhaust valve openings may be regulated based on engine operating conditions.

FIG. 4 shows an example operating sequence 400 illustrating an example operation of a switchable cylinder in an internal combustion engine. The method shows regulation of intake throttle, switchable cylinder throttle element and exhaust valve based on engine operations. The horizontal (x-axis) denotes time and the vertical markers t1-t5 identify significant times in the operation of the soot sensor assembly.

The first plot from the top shows switchable cylinder operation (line 402) dependent on engine load. The second (line 404) and third (line 406) plots show the variation in intake throttle opening and switchable cylinder throttle opening respectively, over time. The fourth plot (line 408) shows the regulation of exhaust valve over time. The fifth plot (line 410) shows the change in engine temperature with time. Dotted line 409 denotes a threshold engine temperature, the engine may be considered warm if the engine temperature is above this threshold. The sixth and final plot (line 414) shows pressure ratio of a compressor arranged upstream of the intake manifold. Dotted line 412 shows the surge limit for the pressure ratio.

Prior to time t1, the engine load may be high and all the cylinders are active. Fuel combustion may take place in each of the cylinders. The cylinders may be divided into two groups, the first group of cylinders remain operational even in the event of a partial deactivation of the internal combustion engine, and the cylinders in the second group are load-dependently switchable cylinders. The intake throttle and the switchable cylinder throttle element opening may be adjusted (based on engine operating conditions) in order to admit a desired air flow into the engine intake manifold. The exhaust valve may be maintained in an active state during this time. In the active state, the exhaust valve may open and close during a cylinder cycle. There may be a plurality of cylinder cycles during the time period prior to time t1. The engine may be warm and the engine temperature may continue to vary within a small degree above the threshold temperature. Prior to time t1, the pressure ratio is maintained well below surge limit.

At time t1, in response to an increase in engine load to above a predetermined threshold and for over a predetermined period of time, it is determined that the switchable cylinders may be deactivated. Fuel supply to the switchable cylinders may be suspended leading to suspension of combustion in these cylinders. Following partial deactivation of the engine, the intake throttle opening may be increased to facilitate improved combustion in the active cylinders. In this example, based on the deactivation of the switchable cylinders, controller may send a signal to an actuator attached to the throttle element(s) corresponding to the switchable cylinders in order to actuate the intake throttle element(s) to a closed position thereby controlling or even suspending air-charge flow into the deactivated cylinders. At this time, the controller may also send a signal to the an actuator of the variable exhaust valve(s) to actuate the variable exhaust valve(s) to a deactivated state in order to prevent any undesired backflow of exhaust gas into a deactivated cylinder. In the deactivated state the exhaust valve may be maintained in a closed position during cylinder cycles. Between time t1 and t2, the engine temperature remains above the threshold with engine temperature continuing to have small variations over time.

At time t2, while the switchable engines are continued to be maintained in deactivated state with the switchable cylinder throttle element and exhaust valve opening in closed position, the engine temperature may drop below the threshold temperature. Thereby in order to increase the engine temperature the exhaust valve may be activated. Once activated the exhaust valve may open and close during a cylinder cycle. As warm exhaust is admitted into the cylinder(s), the engine temperature starts increasing within a short time. Once the engine temperature increases above the threshold, the exhaust valve may be once again deactivated and maintained in closed position. During time t2 and t3, the switchable cylinders are continued to be deactivated and the corresponding throttle elements are maintained in closed position.

At time t3, there is a sudden increase in pressure ratio to above the allowable surge limit. This may be due to a tip-out event. In response to the increase in the pressure ratio, the switchable cylinder throttle element may be opened in order to increase the forward flow through the compressor from the engine intake manifold to the exhaust manifold, thereby reducing the pressure ratio below the surge limit. Also, during this time, the exhaust valve may be activated in order to reduce the pressure ratio. Once the pressure ratio is below the surge limit, the switchable cylinder throttle element may be actuated to closed position and the exhaust valve may be deactivated. Between time t3 and t4, the intake throttle opening can be maintained at the increased level to facilitate operation of the active cylinders. The engine remains warm with engine temperature continues to be above the threshold.

At time t4, once again the engine temperature may drop below the threshold temperature. As before, in order to increase the engine temperature, the exhaust valve may be activated to allow warm exhaust to enter the cylinder(s). With the flow of warm exhaust in the cylinders, the engine temperature starts increasing within a short time. Once the engine temperature increases above the threshold, the exhaust valve may be once again deactivated and maintained in closed position. Operation of the switchable cylinders, intake throttle opening and switchable cylinder throttle element opening may remain unchanged during this time period, between time t4 and t5.

At time t5, it may be determined that the engine load is above a predetermined value for a greater than threshold time period, thereby the switchable cylinders may be re-activated. In response, the opening of the intake throttle may be decreased, the switchable cylinder throttle element may be re-opened and also the exhaust valve may be activated. After time t5, fuel may be supplied and combustion may resume in all cylinders. The engine temperature is above the threshold and the pressure ratio is maintained well below the surge limit.

In one example an internal combustion engine system comprises at least a first and a second cylinder group, each of the first and second cylinder group comprising at least one cylinder, wherein each engine cylinder includes an outlet coupled to an exhaust line for discharging exhaust gases to an exhaust system and an inlet coupled to an intake line for receiving charge air from an intake system, wherein the at least one cylinder of the first cylinder group remains active when engine is partially shut down as a function of engine load, and wherein the at least one cylinder of the second group is deactivated when the engine is partially shutdown; at least one throttle element coupled to the intake line of the at least one cylinder of the second cylinder group to vary a size of a flow cross section of the intake line; and a variable valve drive coupled to an exhaust valve of the at least one cylinder of the second cylinder group, wherein actuation of the variable valve drive deactivates the exhaust valve when the engine is partially shutdown while an intake valve of the at least one cylinder of the second cylinder group remains active. In the preceding example, additionally or optionally, actuation of the variable valve drive oscillates the exhaust valve to realize a valve lift $\Delta h$ between an open position and a closed position of the exhaust valve, and to open up the outlet of the at least one cylinder of the second cylinder group for an opening duration $\Delta t$, and wherein the intake valve of the at least one cylinder of the second cylinder group is coupled to a fixed valve drive. In any or all of the preceding examples, additionally or optionally, the at least one throttle element is one of a valve and a pivotable flap, and wherein the position of the at least one throttle element is continuously adjustable between a fully open and a fully closed position. Any or all of the preceding examples further comprises, additionally or optionally, at least one exhaust-gas turbocharger including a turbine arranged in the exhaust line and a compressor arranged in the intake line. In any or all of the preceding examples, additionally or optionally, the engine includes four cylinders in an in-line arrangement, and wherein the first group of cylinders includes two outer cylinders and wherein the second group of cylinders includes two inner cylinders in the in-line arrangement. In any or all of the preceding examples, additionally or optionally, the at least one throttle element is coupled to the intake line of the at least one cylinder of the second cylinder group upstream of a location where the intake line branches from an overall intake line in an engine inlet manifold. In any or all of the preceding examples, additionally or optionally, the at least one throttle element includes a plurality of throttle elements, each of the plurality of throttle elements coupled to an intake line of a corresponding cylinder of the second cylinder group. Any or all of the preceding examples further comprises, additionally or optionally, at least another throttle element coupled to the intake line of the at least one cylinder of the first cylinder group to vary a size of a flow cross section of the intake line. Any or all of the preceding examples further comprises, additionally or optionally, a controller with computer-readable instructions stored on non-transitory memory for: during the partial shutdown of the engine, deactivating fueling of the second group of cylinders, then closing the throttle element, and then actuating the variable valve drive to deactivate the exhaust valve. In any or all of the preceding examples, additionally or optionally, the variable valve drive varies a lift of the exhaust valve is one of a continuously adjustable and a stepped fashion.

In another example, a method comprises in response to a decrease in engine load below a threshold, selectively deactivating fueling of a second group of cylinders while maintaining a first group of cylinders active; then, deactivating exhaust valves of the second group of cylinders after completing an exhaust stroke while maintaining intake valves of the second group of cylinders active; and; after deactivating the exhaust valves, closing a throttle element in an intake line of the second group of cylinders; and during cylinder reactivation, fully opening the throttle element before reactivating the exhaust valves and resuming fueling of the second group of cylinders. In the preceding example, additionally or optionally, selective deactivating the exhaust valves while maintaining intake valves active includes selectively deactivating a variable valve mechanism coupled to the exhaust valves of the second group of cylinders, the variable valve mechanism not coupled to the intake valves of the second group of cylinders. Any or all of the preceding examples further comprises, additionally or optionally, in response to a drop in engine temperature, actuating the variable valve mechanism to admit warm exhaust gas from an exhaust line into the second group of cylinders. In any or all of the preceding examples, additionally or optionally, the engine is a boosted engine including an intake compressor, the method further comprising, in response to a pressure ratio exceeding a surge level, fully opening the throttle element while actuating the variable valve mechanism to decrease the pressure ratio below the surge level. In any or all of the preceding examples, additionally or optionally, closing the throttle element includes adjusting a degree of closure of the throttle element based on engine operating conditions, the degree of closure increased as engine load increases while the second cylinder group is deactivated. In any or all of the preceding examples, additionally or optionally, the second group of cylinders includes a plurality of cylinders, each of the plurality of cylinders coupled to an intake line, and wherein the throttle element is coupled to the intake line of each of the plurality of cylinders in the second group of cylinders.

In yet another example, a method comprises in response to cylinder deactivation conditions being met, deactivating fuel to a second group of cylinders while maintaining fueling of a first group of cylinders; closing a throttle element coupled to an intake line of the second group of cylinders; actuating a variable valve mechanism to deactivate exhaust valves of the second group of cylinders while maintaining intake valves active. In the preceding example, additionally or optionally, after the throttle element is closed after deactivating the fuel, and wherein the exhaust valves are deactivated before an exhaust stroke following the throttle element closing. In any or all of the preceding examples, additionally or optionally, the exhaust valves are deactivated after an exhaust stroke following the fuel deactivation, and the throttle element is closed after the exhaust valves are deactivated. In any or all of the preceding examples, additionally or optionally, in response to cylinder reactivation conditions being met, selectively reactivating fuel to the second group of cylinders while actuating the variable valve mechanism to reactivate the exhaust valves of the second group of cylinders; and then opening the throttle element. In any or all of the preceding examples, additionally or optionally, actuating the variable valve mechanism to deactivate the exhaust valves includes reducing a valve lift of the exhaust valves for a duration of the deactivation, and wherein actuating the variable valve mechanism to reactivate the exhaust valves includes increasing the valve lift of the exhaust valves while resuming cylinder fueling.

In this way, during partial cylinder deactivation, by partially or fully closing a throttling element in an intake line of the switchable cylinder charge-air flow rate supplied to the deactivated cylinders may be regulated. The regulation of charge-air in such cylinders may reduce pumping and charge exchange losses in the engine. The technical effect of partially or completely closing the variably actuated exhaust valve of the switchable cylinders during partial cylinder deactivation is that any undesired backflow of exhaust gas into a deactivated cylinder may be reduced or completely prevented. Consequently engine efficiency and fuel economy may be improved during partial cylinder deactivation conditions. Also, by not using a variable valve actuation mechanism with the intake valves, component and cost reduction may be achieved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine system comprising:
at least a first and a second cylinder group, each of the first and second cylinder groups comprising at least one cylinder, wherein each cylinder includes an outlet coupled to an exhaust line for discharging exhaust gases to an exhaust system and an inlet coupled to an intake line for receiving charge air from an intake system, wherein the at least one cylinder of the first cylinder group remains active when an engine is partially shut down as a function of engine load, and wherein the at least one cylinder of the second cylinder group is deactivated when the engine is partially shutdown;
at least one throttle element coupled to the intake line of the at least one cylinder of the second cylinder group downstream of a location where the intake line branches from an overall intake line in an engine inlet manifold to vary a size of a flow cross section of the intake line;
a variable valve drive coupled to an exhaust valve of the at least one cylinder of the second cylinder group, wherein actuation of the variable valve drive deactivates the exhaust valve when the engine is partially shutdown while an intake valve of the at least one cylinder of the second cylinder group remains active; and
a controller with computer-readable instructions stored in non-transitory memory for:
in response to cylinder deactivation conditions being met,
deactivating fueling of the second cylinder group while maintaining fueling of the first cylinder group, closing the at least one throttle element, and maintaining the intake valve active while actuating the variable valve drive to deactivate the exhaust valve before an exhaust stroke following the at least one throttle element closing.

2. The system of claim 1, wherein actuation of the variable valve drive oscillates the exhaust valve to realize a valve lift $\Delta h$ between an open position and a closed position of the exhaust valve, and to open up the outlet of the at least one cylinder of the second cylinder group for an opening duration $\Delta t$, and wherein the intake valve of the at least one cylinder of the second cylinder group is coupled to a fixed valve drive.

3. The system of claim 1, wherein the at least one throttle element is one of a valve and a pivotable flap, and wherein a position of the at least one throttle element is continuously adjustable between a fully open and a fully closed position.

4. The system of claim 1, further comprising at least one exhaust-gas turbocharger including a turbine arranged in the exhaust line and a compressor arranged in the intake line.

5. The system of claim 1, wherein the engine includes four cylinders in an in-line arrangement, and wherein the first group of cylinders includes two outer cylinders and wherein the second group of cylinders includes two inner cylinders in the in-line arrangement.

6. The system of claim 1, wherein the at least one throttle element includes a plurality of throttle elements, each of the plurality of throttle elements coupled to an intake line of a corresponding cylinder of the second cylinder group.

7. The system of claim 1, further comprising at least another throttle element coupled to the intake line of the at least one cylinder of the first cylinder group to vary a size of a flow cross section of the intake line.

8. The system of claim 2, wherein the variable valve drive varies a lift of the exhaust valve in one of a continuously adjustable and a stepped fashion.

9. A method, comprising:
in response to a decrease in engine load below a threshold,
selectively deactivating fueling of a second group of cylinders while maintaining a first group of cylinders active;
then, deactivating exhaust valves of the second group of cylinders after completing an exhaust stroke while maintaining intake valves of the second group of cylinders active;
after deactivating the exhaust valves, closing a throttle element in an intake line of the second group of cylinders; and
during cylinder reactivation,
fully opening the throttle element before reactivating the exhaust valves and resuming fueling of the second group of cylinders.

10. The method of claim 9, wherein selectively deactivating the exhaust valves while maintaining the intake valves active includes selectively deactivating a variable valve mechanism coupled to the exhaust valves of the second group of cylinders, the variable valve mechanism not coupled to the intake valves of the second group of cylinders.

11. The method of claim 9, further comprising, in response to a drop in engine temperature, actuating a variable valve mechanism to admit warm exhaust gas from an exhaust line into the second group of cylinders.

12. The method of claim 9, wherein an engine is a boosted engine including an intake compressor, the method further comprising, in response to a pressure ratio exceeding a surge level, fully opening the throttle element while actuating a variable valve mechanism to decrease the pressure ratio below the surge level.

13. The method of claim 9, wherein closing the throttle element includes adjusting a degree of closure of the throttle element based on engine operating conditions, the degree of closure increased as engine load increases while the second cylinder group is deactivated.

14. The method of claim 9, wherein the second group of cylinders includes a plurality of cylinders, each of the plurality of cylinders coupled to an intake line, and wherein the throttle element is coupled to the intake line of each of the plurality of cylinders in the second group of cylinders.

15. A method for an engine, comprising:
in response to cylinder deactivation conditions being met,
deactivating fuel to a second group of cylinders while maintaining fueling of a first group of cylinders;
closing a throttle element coupled to an intake line of the second group of cylinders; and
actuating a variable valve mechanism to deactivate exhaust valves of the second group of cylinders while maintaining intake valves active, wherein the throttle element is closed after deactivating the fuel, and the exhaust valves are deactivated before an exhaust stroke following the throttle element closing.

16. A method for an engine, comprising:
in response to cylinder deactivation conditions being met,
deactivating fuel to a second group of cylinders while maintaining fueling of a first group of cylinders;
closing a throttle element coupled to an intake line of the second group of cylinders; and
actuating a variable valve mechanism to deactivate exhaust valves of the second group of cylinders while maintaining intake valves active, wherein the exhaust valves are deactivated after an exhaust stroke following the fuel deactivation, and the throttle element is closed after the exhaust valves are deactivated.

17. The method of claim 15, wherein in response to cylinder reactivation conditions being met,
selectively reactivating fuel to the second group of cylinders while actuating the variable valve mechanism to reactivate the exhaust valves of the second group of cylinders; and
then opening the throttle element.

* * * * *